Jan. 22, 1974  G. R. WEBER  3,787,587
ACCELERATED AGING OF ALCOHOLIC BEVERAGES
Filed Dec. 22, 1971  5 Sheets-Sheet 4

Jan. 22, 1974　　　　　G. R. WEBER　　　　3,787,587
ACCELERATED AGING OF ALCHOLIC BEVERAGES
Filed Dec. 22, 1971　　　　　　　　　　　　5 Sheets-Sheet United States Patent Office 3,787,587
Patented Jan. 22, 1974

3,787,587
ACCELERATED AGING OF ALCOHOLIC BEVERAGES
George Robert Weber, 16 Chemin Rojoux, 1211, Geneva-Conches, Switzerland
Continuation-in-part of abandoned application Ser. No. 835,536, June 23, 1969. This application Dec. 22, 1971, Ser. No. 210,925
Int. Cl. C12h 1/16
U.S. Cl. 426—248                6 Claims

ABSTRACT OF THE DISCLOSURE

A process for the accelerated aging and maturation of alcoholic beverages normally subject to prolonged periods of aging, i.e., beers, distilled spirits, wines, etc., which comprises continuously passing actinic light into the beverage in substantially the wave-length range of about 4000 A. to 5500 A. at an irradiation dosage of about $1 \times 10^{-1}$ to about $1 \times 10^{-3}$ watts-sec./cm.$^3$. The resulting beverage has substantially the same chemical constituency and characteristics as the conventionally aged product.

Figure 1:
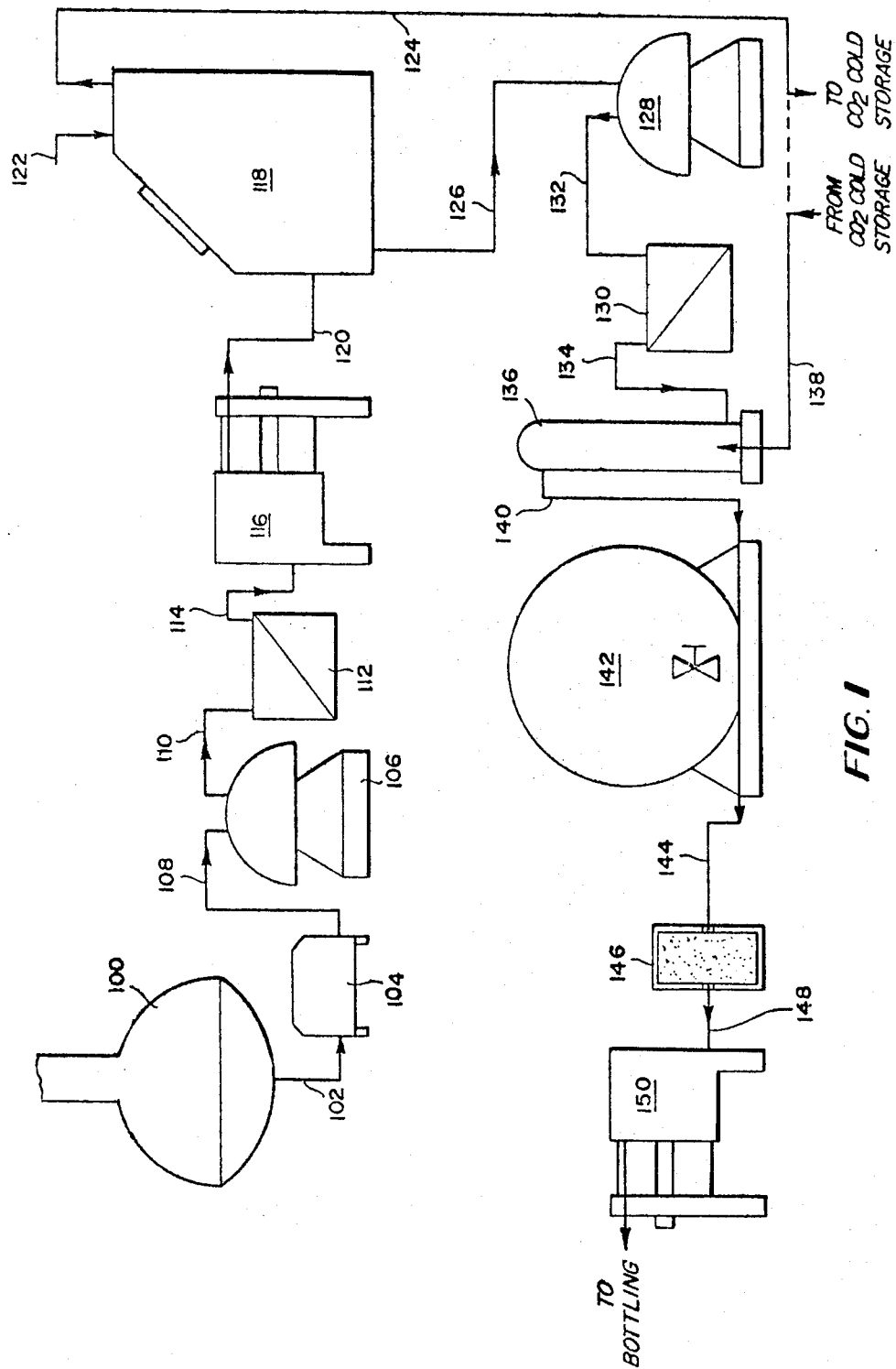

This application is a continuation-in-part of co-pending application Ser. No. 835,536, filed June 23, 1969, now abandoned.

The present invention is directed toward a process for the accelerated aging of alcoholic beverages; more particularly, the present invention is directed to a method by which the aging of beer, wines, distilled spirits, etc. can be accelerated to the point of being a fraction of that previously utilized by subjecting the beverage to one or more operations involving irradiation with actinic light.

Practically all alcoholic beverages including beer, distilled spirits, i.e., whiskeys, brandy, etc., and wines are allowed to age or mature through standing and storage over prolonged periods of time. Thus, for example, it is conventional in beer manufacture to store the beer after fermentation for a period of time ranging up to and greater than 24 days so as to improve the stability and insure long and satisfactory quality of the desired beverage. Similarly, substantially all distilled spirits pass through an aging or maturation stage, the degree of aging depending somewhat on the character of the spirit. Thus, for example, brandy is presumably best when allowed to age for 15 or 20 years, whereas gin, a highly refined spirit, need not be aged very long and presumably does not benefit from maturation of more than about one year. Other spirits including whiskeys, i.e., bourbon whiskey, corn whiskey, rye whiskey, straight whiskey, scotch whiskey, blended whiskey, etc., are all allowed to mature or age for periods of time ranging from 4 to about 15 years. Generally, the aging of such whiskeys is conducted in charred, wooden barrels wherein the chemical composition of the spirit changes with passage of time while water slowly evaporates through the wood such that the percentage of alcohol within the spirit increases.

As mentioned above, the aging or maturation of alcoholic beverages including among others, beer, distilled spirits, wines, etc., involves a chemical change of the principal and secondary components found within the alcoholic beverage. In this regard, the principal component of all distilled spirits is ethyl alcohol, which is diluted with water and various secondary and teritary ingredients to give the spirit its essential characteristics. The raw material from which the spirit is made, i.e., grain, etc., incorporates a quantity of substances which are carried throughout the fermentation and the distillation and enter into the aging process. In this regard, the degree of aging somewhat effects the nature and content of such secondary and tertiary ingredients, thus providing specialized characteristics to the distilled spirit.

Generally, the secondary substances of spirits can be classified as higher alcohols, esters, acids, aldehydes, and other miscellaneous materials. The higher alcohols present in distilled spirits are fatty alcohols higher than ethanol. The particular make-up of the higher alcohols present in the spirit depends somewhat on the raw material from which the spirit is made. Thus, for example, pot still whiskies produce a higher alcohol mixture composed of isoamyl and isobutyl ingredients, as well as propyl alcohol, while a neutral grain spirit such as gin contains substantially no appreciable amount of the higher alcohols.

The esters present in the distilled spirits are formed during the fermentation period and are present as a result of the inter-mixture of the alcohol and acids present. Some of the esters arise from the fatty acids combining with a small amount of ethyl or amyl alcohols to produce ethyl acetate, the principal ester. Other esters present, however, include such as ethyl valerate, ethyl butyrate, etc.

The acids present in distilled spirits generally comprise acetic acid, although other acids can be present in the spirit in varying amounts. Thus, for example, butyric, tartaric and succinic acids can be found in some distilled spirits. These are the best known acids found in alcoholic beverages.

The aldehydes that are present in such spirits and similar alcoholic beverages result from the oxidation of the ethyl alcohol. Furfural or pyromucic aldehyde is formed at the beginning of distillation and diminishes somewhat as the spirit develops during aging.

Other substances such as essential oils, terpenes, and minor volatile ingredients are called tertiary constituents and like the secondary components present in the spirit add to the character of the individual product. The character of all of such volatile components present as by-products or secondary components in spirits and similar alcoholic beverages change in form and content during the aging or maturation process. Accordingly, one faced with the problem of accelerating the aging or maturation process to which such alcoholic beverages are generally subjected is faced with the problem of providing an alcoholic beverage, be it beer, distilled spirits, wine, etc., which after a short period of aging or maturation has a chemical constituency closely analogous to that achieved through the conventional long-aging process.

With respect to the aging or maturation of alcoholic beverages such as beers, distilled spirits, wines, etc., it should be obvious that the long periods of aging necessary to produce a satisfactory product prior to the development of the present invention are disadvantageous from a number of standpoints. First of all, it should be quite obvious that from an economic standpoint, the tying up of capital over a period of several years is an extreme disadvantage associated with the conventional aging and maturation of alcoholic beverages. In this regard, for example, bourbon whiskies and scotch whiskies generally require aging for a period of time ranging from about 4 years to about 15 years in specialized barrels, bourbon being conventionally aged in new, charred, oak barrels. It is quite clear, therefore, that if such aging or maturation process can be reduced in time a considerable economic advantage can result.

It should be still further recognized that the aging or maturation of beer, distilled spirits, wine, and similar alcoholic beverages requires that the distillery or brewery contain vast areas in which the alcoholic beverage can be stored for the required period of time. Here again, therefore, if such period of aging can be substantially reduced tremendous savings in capital outlay and adaptation of facilities can be realized. This is especially true when concerned with the building of a new brewery or distillery which, if based upon an accerated aging or maturation of the brewed or distilled product, can be constructed with minimum facilities for storage and aging.

It should still be further realized that the prolonged periods of aging and maturation now necessary in the production of alcoholic beverages somewhat reduce the availability of complete reproducibility of the final product. In this regard, since the beer, distilled spirit, or wine must be stored over prolonged periods of time subject to variations in storage conditions, it is difficult to precisely predict and reproduce the desired product.

Again, all of these disadvantages associated with the conventional aging and maturation of alcoholic beverages can be minimized through the provision of a process by which the aging and maturation of such alcoholic beverages can be accelerated while still obtaining a product, albeit, beer, distilled spirit or wine which has a chemical constituency and characteristics of flavor, etc. which are equivalent to and match those characteristics associated with the same alcoholic beverages subjected to prolonged periods of aging and maturation.

U.S. Pat. 3,037,116 issued in the name of Georges Weber discloses apparatus which can be used in the irradiation of beer to effect changes which occur during the aging or maturation of such alcoholic beverage. It has been discovered in accordance with the present invention, however, that through the control of certain variables and parameters associated with the irradiation of alcoholic beverages an improved process can be developed which is capable of providing an alcoholic beverage product, i.e., beer, distilled spirit, wine, etc., which closely approximates and is substantially equivalent to the conventionally aged product with respect to chemical constituency and characteristics of taste, etc. In this regard, it has been discovered in accordance with the present invention that by irradiating, one or more times, such alcoholic beverages or constituents thereof under the conditions to be hereinafter described, it is possible to provide for the accelerated aging and maturation process long sought after by the brewing and distilling arts.

Accordingly, it is a principal object of the present invention to provide a novel process for the accelerated aging and maturation of alcoholic beverages which process allows for the production of a product of substantially equivalent properties as conventionally aged and matured beverages within an extremely short period of time.

It is a further object of the present invention to provide such a process for the accelerated aging and maturation of beer, distilled spirits, wines, and similar alcoholic beverages as well as the products of such process wherein such products substantially resemble in chemical constituency, taste, aroma, etc. a similar product which has been conventionally aged and matured.

It is yet a further object of the present invention to provide such a process and product wherein the accelerated aging of the alcoholic beverage or constituents thereof is achieved by one or more, preferably one or two, periods of irradiation wherein the beverage or its constituents are subjected to actinic light having a wave-length within the range of above ultra-violet-5500 A.

Yet a further object of the present invention relates to a process for the accelerated aging of alcoholic beverages and the products of such process wherein the beverage normally subjected to aging and maturation over a substantially long period of time is subjected to irradiation by such actinic light one or more times, preferably one or two times.

Still further objects of the novel process and product produced by such process will become more apparent from the following more detailed description of the present invention.

As indicated above, the novel improved process of the present invention is applicable to the accelerated aging of any and all alcoholic beverages normally subjected to a prolonged aging or maturation process. Accordingly, as employed throughout the instant specification and claims such an expression is meant to embrace, among others, beers, distilled spirits, wines, etc.

Beer is the general term for all classes of beers, both draft, bottled, and canned, pale ales, lagers, and stouts. It is brewed from malt, sugar hops, and water and fermented with yeast. The beer quality is largely dependent on the suitability of these main raw materials and the type of beer being produced.

In the production of beer, barley is employed as the source of malt. Special types of barley are grown and carefully ripened, the barley, in the malting, being dampened with water and allowed to germinate under controlled conditions in order to convert the insoluble starch to soluble sugar. It is then dried and cured to a pale color for pale beers and to a richer color for dark beers.

The sugars used in brewing are manufactured from cane sugar which is treated in a variety of different ways to yield various flavors and various degrees of sweetness. Similarly, hops are specially grown for brewing, only the flower, which is a cone of golden petals, carrying resin and oils being used. The use of hops gives the beer its bitter flavor. The water used in brewing is usually specially treated with mineral salts for the particular type of beer being processed, the other major constituent being yeast, a living organism, the agent which ferments the beer.

The brewing process is not a very complicated operation. The malt passes through a mill and is crushed, after which it is mixed with water at a carefully controlled temperature. The sugar solution from the mixture is drawn off from the vessel. Rotating water sprinklers spray the grain to ensure that all the malt extract is used, leaving only husks which are usually sold as cattle food.

The solution, called wort, is pumped to the boiling coppers where hops and sugar are added. The resultant mixture is boiled for an hour or two and, in the process, the aroma and distinct bitterness of hops combine with the sweetness and flavor derived from the wort and sugar. After boiling, the hops are removed by straining, and the wort is cooled and collected in a vessel where yeast is added. It splits the sugars into alcohol and carbon dioxide gas; the gas is usually collected for later use in carbonating bottled and canned beers.

Fermentation takes several days, at the end of which the bulk of the yeast, in the case of lager, settles on the bottom of the fermenting vessel. In the case of ale it rises to the top of the beer. In both cases it is collected. The yeast produced during fermentation is several times the original quantity and is used for subsequent fermentations, the surplus forming a very valuable by-product as it is a source of vitamins for humans or animals.

In most beer-consuming countries, the beer so produced is thereafter stored in large storage tanks, usually cold storage tanks near the freezing point of the beer so as to insure long and satisfactory quality and improve the stability of the beverage. After such prolonged period of storage, usually up to or above 24 days, which period of storage can be eliminated in accordance with the process of the present invention, the beer is filtered, carbonated, and filled into a cask, bottle, or can for dispatch to the consumer. In addition, most beers are now pasteurized so as to insure that any minute quantities of yeast that may above been left in the beer after filtration do not ferment and multiply and in so doing, turn the beer cloudy.

The term "lager" is a name applied to most beers produced in the United States and in many foreign countries. Such a beer is one that is allowed to rest until all the sediment of the fermentation has cleared and then carbonated and bottled. Such a beer also is one which is aged or matured by storage over prolonged periods of time, a step which can be eliminated in accordance with the process of the present invention.

Similarly, ale, stout, porter, and bock are names given to different types of beer which are fermented under different temperature conditions or with different strains of yeast. Here again, however, each of these types of beer is normally subjected to an aging or maturation process which aging or maturation process can be eliminated or substantially reduced in accordance with the process of the present invention. Again, therefore, the term "alcoholic beverage normally subjected to prolonged aging or storage" is meant to embrace any and all of such beer products.

Similarly, the term "alcoholic beverage normally subjected to prolonged aging or maturation periods" is meant to embrace "distilled spirits," a generic term embracing potable alcoholic liquids obtained through distillation. Such a term includes, for example, brandies, whiskies, gin, vodka, and other potable alcoholic liquids which are distilled and aged or matured over prolonged periods of time.

The term "brandy" is generally meant to connote a distilled wine and when employed alone, qualifies the product as a product of the distillation of grapes. However, the term "brandy" is now properly applied to distillates from other fruit including, for example, apples, pears, cherries, etc. In this connection, when applied to the distillates of such fruits other than grapes, the description of the alcoholic beverage will generally describe the source of the brandy.

It is generally recognized that the secret of a fine brandy is partly in the nature of the wine that is distilled and partly in the distilling process; it is also quite apparent, however, that the secret of a fine brandy is somewhat dependent upon the aging and maturation of the distilled wine. In this regard, the aging of the bandy as well as other distilled spirits is generally carried out in wooden barrels since little, if any, change in the chemical content or characteristics of the brandy occurs after bottling. Thus, many fine brandies are aged for periods of time of up to 15 to 20 years in order to create the characteristic flavor of the alcoholic beverage. Here again, however, this process can be substantially eliminated through the improvement of the present invention by which the aging and maturation of the distilled spirit can be obtained in a substantially shortened period of time with the characteristics of the obtained product being substantially equivalent to those characteristics possessed by the fully aged and matured product now produced. Accordingly, brandies, as well as the other distilled spirits to be hereinafter defined, fall within the class of alcoholic beverages which are normally subjected to prolonged periods of aging and maturation and which can be improved with respect to production characteristics by the improved process of the present invention.

With respect to the above-described brandies and the hereinafter described whiskies, etc., it is pointed out that all of these spirits are of a distilled character. The art or science of distilling as it pertains to the production of spirits is based on the fact that alcohol, being lighter than water, vaporizes at a lower temperature, with the result that when a slightly alcoholic liquid is heated to a temperature between the two boiling points the vapors that rise can be caught and condensed back to form a liquid with a higher alcoholic content. Thus, in the production of alcoholic spirits distilling is done either in single shot pot-stills or continuous patent stills, the quality and characteristics of the spirit desired, dictating the method employed.

Another group of distilled spirits to which the process of the present invention is particularly applicable is the whiskies. Whiskey is the general name given to a distilled spirit made from grain. While any grain may be utilized in the production of whiskey, some of the more important are corn and rye with some millet, sorghum, and barley being utilized. In the production of whiskey the grain is mashed (diluted with water and cooked in huge pressure cookers) and then left to ferment into "beer" or "distiller's beer." Sweet mash whiskey is made by adding selected yeasts to start the fermentation; sour mash whiskies being produced by triggering fermentation with some leftover "spent beer" or "draff," i.e., the residue of a previous fermentation. Both "beer" and "draff" are then pumped into huge patent stills for distillation and rectification.

With respect to the distillation of whiskey, some countries have laws which dictate the nature of the distillation process. Thus, by American law, all whiskey must be distilled at less than 190° proof U.S. or about 95 percent alcohol. Above that figure, the spirit loses all the characteristics of the grain used and becomes merely neutral or silent spirits. Most whiskey is distilled from 140° to 160° proof and some as low as 125, notably, some of the better bourbons and ryes. After distillation, the whiskey is diluted and aged for periods of time ranging from 2 years to 15 to 20 years or more. It is such aging of the whiskey which can be substantially eliminated in accordance with the process of the present invention by which a single or multiple irradiation of the whiskey with actinic light within the parameters as to be hereinafter described allows for the production of a product having characteristics substantially equivalent to the previously produced aged spirits.

Whiskies are generally defined as bourbon whiskey, corn whiskey, rye whiskey, straight whiskey, blended straight whiskey, blended whiskey, scotch whiskey, etc.

Bourbon whiskey is generally defined as any whiskey distilled at no more than 160° proof and stemming from a mash of at least 51% corn. In accordance with compliance with current required practice in the United States, for example, the bourbon whiskey is aged for not less than 4 years in new, charred, oak barrels. Such a whiskey can be made by either a sweet mash or sour mash process. Again, however, while such bourbon whiskies are now aged for a period of at least 4 years in new, charred, oak barrels, it has been discovered in accordance with the present invention that such prolonged aging or maturation period can be substantially and materially reduced in accordance with the improved process of the present invention.

Corn whiskey differs from bourbon in that corn whiskey must be made from a mash of at least 80% corn. In accordance with conventional practice, such corn whiskey may be aged in used, or uncharred barrels as well as the new charred, oak barrels required for the current aging of bourbon whiskies. Here again, such corn whiskey is of the type which is normally subjected to a prolonged aging and maturation period and which can have such processing improved in accordance with the process of the present invention.

Rye whiskey is a well-known whiskey produced from a mash which must contain at least 51% rye, distillation being carried out to a proof no higher than 160. Here again, the rye whiskey is conventionally aged in new, charred oak barrels for a period of time of at least 2 years. Accordingly, here again, such rye whiskey falls into the category of alcoholic beverages which are normally subjected to prolonged periods of aging and maturation and the processing of which can be improved through the process of the present invention.

Straight whiskey is a term applied to whiskey which is distilled at no more than 160° proof and which is aged for a period of at least 2 years. Blended straight whiskey is term which is applied to a blend of two or more straight whiskies, a form in which many rye whiskies occur.

Scotch whiskey is a distilled product produced from barley and is a whiskey which is generally produced in a blended form, the single or straight scotch whiskies rarely being commercialized. Thus, in the production of scotch, the barley is "malted" to produce the malt from which the whiskey is produced through distillation. In the production of the blended scotch whiskey, the distillate products of 40% malt whiskey and 60% grain whiskey are generally blended and "married" to produce the final scotch. Here again, the scotch is generally aged and matured in barrels for varying periods of time ranging from about 2 years to 12 years or more. Accordingly, here again, the scotch whiskey is a distilled spirit, the processing of which can be improved in accordance with the process of the present invention.

Gin and vodka are also alcoholic beverages falling within the general class of distilled spirits upon which the process of the present invention can be suitably practiced. Thus, gin is a juniper flavored spirit obtained by the distillation and rectification of the grain spirits of malted barley and rye, and sometimes of corn or maize. Theoretically, however, gin can be made from any rectified spirit. In this regard, gin is essentially the product of re-distillation or re-rectification of a spirit, the re-distillation being conducted to a point that the harmful characteristics of any raw spirits are removed leaving practically pure alcohol. In making the gin, the distilled product is thereafter re-distilled with flavoring such as juniper berries and various other ingredients or the flavoring agents such as juniper berries are merely added to the re-distilled spirits. If a gin is exceptionally dry in that it has been re-distilled to remove all of the harmful constituents and yield substantially pure alcohol, the product is not generally aged; however, aging of one or more years is conventionally carried out with respect to some of the lesser quality gins produced through less than complete or substantially complete reduction of the spirits to alcohol. Accordingly, it is with respect to such distilled spirits which are conventionally aged or matured that the process of the present invention is particularly applicable.

Similarly, vodka which is popularly assumed to be a spirit produced from potatoes is now most likely to be produced from grain. Like gin, vodka is distilled at very high proof rectified into a spirit, with neither the taste nor the aroma of the materials used. Unlike gin, however, vodka remains unflavored although some individual vodkas are infused with herbs. In this connection, some vodkas infused with herbs and other slight flavoring agents are aged for periods of time ranging from 1 to more than 3 years. Accordingly, it is with respect to such distilled spirits normally subjected to aging or maturation for substantial periods of time that the process of the present invention is particularly applicable.

Similarly, rum is a distilled spirit which is normally subjected to an aging process. In this regard, rum is the distillate of products of fermented sugar cane, this spirit retaining more natural taste factors from its product of origin than any other distilled spirit. Thus, in the production of rum, the conventional process by which starches are turned into sugar are not necessary, nor does rum have to be distilled at a very high proof such as gin or vodka. Thus, rum receives a minimum of chemical treatment and can be conventionally aged in any conventional manner utilized for spirit making. Generally, the only coloring matter used is sugar caramel, a material which does not effect the flavor of the rum.

Again, it is pointed out that rum is a distilled spirit which is normally subjected to a prolonged aging period over a period of 2, 4 or more years. Accordingly, here again, as was the case with respect to the previously described spirits, the production of rum can be greatly facilitated in accordance with the process of the present invention by which the taste and bouquet of the product can be improved through an accelerated aging and maturation process.

It is pointed out that the above described distilled spirits are only exemplary of those which can be advantageously utilized in accordance with the process of the present invention. Here again, it is noted that the process of the present invention resides in an improvement associated with the processing of any and all alcoholic beverages, including distilled spirits, which are normally subjected to a prolonged aging or maturation period. Thus, any such distilled spirits or other alcoholic beverages subjected to such aging or maturation, can be employed in accordance with the process of the present invention.

When as stated above, the process of the present invention provides for an accelerated aging or maturation of the alcoholic beverage it is not meant that an actual aging or maturation occurs. However, by employing the process of the present invention, the effects of aging and maturation of the alcoholic beverage are simulated and reproduced in a substantially shortened period of time without the necessity of prolonged periods of storage to obtain the effects of aging. In this respect, the aging and maturation of the alcoholic beverage is indeed accelerated.

As a last general class of alcoholic beverages which can be suitably employed in accordance with the process of the present invention, mention is made of wines in general. The term "wine" which most properly should be applied only to the naturally fermented juice of grapes, is often extended to include not only wines produced from grapes but wines made from vegetables, berries, and other fruits. Accordingly, all such products normally subjected to prolonged periods of aging and storage can be suitably utilized in accordance with the process of the present invention. True wines produced from grapes are generally divided into three main types:

(1) Still beverage, or table wines to accompany a meal. These divide again into red, white, and rose (according to the grapes used and the length of time the skins have been left to ferment with the juice); and into dry or sweet wines, depending on whether all the grape sugar has been allowed to ferment into alcohol, or whether some residual sugar has been left.

(2) Sparkling wines, of which Champagne, made by the process of secondary fermentation in bottle, is the finest example.

(3) Fortified wines, such as Port, Sherry, and Madeira, to which brandy has been added.

Like the previously described alcoholic beverages, the wine produced from grapes is subjected to alcoholic fermentation, a biochemical phenomenon which causes sugar to be transformed into ethyl alcohol and carbon dioxide. Thus, for example, the fermentation of grapes in the production of wine generally produces a wine having the following elements present:

Water
Sugars:
    glucose
    fructose
    pentoses
Alcohols:
    ethanol
    glycerol
    2,3-butanediol
    acetoin
    isoamyl
    active amyl
    isobutyl
    n-propyl
Esters:
    ethyl acetate
    ethyl succinate
    ethyl lactate
    other esters
Acids:
    tartaric
    malic
    citric
    succinic
    lactic
    acetic Minerals:
    sodium
    potassium
    calcium
    iron
    phosphate
    copper
    sulphate
Nitrogenous substances:
    ammonia
    amino acids
    proteins
Acetaldehyde
Phenolic substances
Color pigments
Vitamins After fermentation, wines are sometimes subjected to an initial aging period for one year or longer after which further fermentation of the wine occurs. This initial maturation, of course, can be reduced through the employment of the process of the present invention. After final fermentation of the wine, the wines are generally subjected to further aging both in barrel and in bottle to improve the quality of the alcoholic beverage. During such aging or maturation of the wine, a decrease in acidity is observed as is the transformation of the alcohol, acids, and other components present to form an enumerable complex compounds including esters, aldehydes, acetals, and the like. These are of course essentially the same changes which take place during the aging of beer or the aging of distilled spirits as described above.

It is accordingly such changes in the characteristics of the alcoholic beverage which are reproduced in accordance with the process of the present invention whereby aging and maturation over prolonged periods of time are eliminated by a single, double, or further multiple irradiation of the alcoholic beverage or its constituents with actinic light within the range of above ultra-violet light-5500 A. under the parameters or conditions as to be hereinafter described.

Again, it is pointed out that in accordance with the process of the present invention any alcoholic beverage normally subjected to prolonged periods of aging and maturation can be utilized. Again, broadly, such materials include beer, distilled spirits, and wine although a variety of other materials not falling within the above three categories can be advantageously utilized. In this regard, it is again pointed out that the process of the present invention has as its principal objective an elimination of the prolonged periods generally employed for the aging of such alcoholic beverages and the reproduction of the characteristics of the alcoholic beverage and the chemical constituency thereof in a substantially shortened period of time through irradiation with actinic light.

Although each of the above described classes of alcoholic beverages have distinctive characteristics, it is again pointed out that the three classes of beverages are alike in that the various products within such classes are normally subjected to a prolonged aging, generally in wooden barrels. It is this aging which has been eliminated in accordance with the process of the present invention whereby the characteristics of the fully aged and mature beverage are simulated and reproduced without subjecting the beverage to an aging process but, subjecting the beverage to one or more passes before actinic light.

Generally, actinic light, as employed throughout the instant specification and appended claims, is light of a predetermined wave-length which is capable of stimulating certain chemical reactions. In accordance with the process and products of the present invention, the actinic light is light concentrated in a range of wave-lengths of above ultra-violet light to about 5500 A.

Thus, it has been found in accordance with the present invention that in order to obtain a final product having a body, bouquet, taste and mellowness of a commercially aged beer, distilled spirit, wine, etc., it is essential that the beverage or its constituents be irradiated with light within the above noted wave-length region.

In this regard it has been discovered, in accordance with the present invention that if wave-lengths in the ultraviolet region are employed, an ozone taste is created and other problems creating possible hazards to the consumer are created. At the other end of the scale, if wave-lengths greater than 5500 A. are utilized, a "skunky" taste is created thereby providing a poor product which is not commercially acceptable. Again, therefore, in order to produce a product having characteristics substantially like those of the conventional aged product, while eliminating costs of construction with respect to storage etc., it is a necessary and essential characteristic of the instant process that the beverage or its constituents be irradiated with actinic light within the wave-length region of above ultra-violet-5500 A.

The wave-length of from above ultra-violet light to 5500 A. as set forth above is meant to embrace the inclusion of light within such range to the substantial exclusion of light below and above the same. In this regard, in carrying out the process of the present invention filters are placed between the light source and the beverage which is irradiated so as to absorb substantially all the ultra-violet light emitted from the light source and substantially all of the light of wave-lengths greater than about 5500 A. Accordingly, the light which is incident upon the alcoholic beverage in carrying out the process of the present invention is substantially free of ultra-violet light. Suitable filters which are utilized include, for example, Plexiglas filters, particularly a Plexiglas filter sold under the name Plexiglas UF–3. Accordingly, the wave-length region of from above ultra-violet light to 5500 A. as indicated in the instant specification is noted to embrace light substantially within the above region incident upon the alcoholic beverage with the substantial absence of ultra-violet light or light of wave-lengths above the aforementioned range.

Since ultra-violet light is reported to be that light below about 4000 A., the range of actinic light incident upon the alcoholic beverage in carrying out the process of the present invention can be defined as from about 4000 A., i.e., above the maximum of ultra-violet light to about 5500 A. As indicated previously, within this range none of the aforementioned defects associated with the irradiation with ultra-violet light are encountered and the accelerated aging of the alcoholic beverage can be carried out efficiently and effectively.

The apparatus employed in carrying out the process of the present invention may comprise an apparatus such as disclosed in U.S. Pat. 3,037,116. Such patent discloses an apparatus for irradiation through which a liquid can be passed and forced to follow a tortuous path. Such an apparatus, of course, can be employed in accordance with the process of the present invention by which an alcoholic beverage or its components are irradiated with actinic light by one or more passes of the beverage in the path of a light source. Similarly, copending application Ser. No. 835,376, filed June 23, 1969, discloses apparatus in which the process of the present invention can be advantageously carried out. It is also pointed out that in addition to the apparatus specifically disclosed in U.S. Pat. 3,037,116 and that disclosed in the aforementioned copending application, other equivalent apparatus allowing a flow of the beverage or its components in the path of the actinic light can be advantageously utilized in carrying out the novel process of the present invention.

While the light which is incident upon the alcoholic beverage must be within the aforementioned range in order to effectively carry out the accelerated aging process of the present invention, it is also necessary that the alcoholic beverage be irradiated with a light dosage allowing the achievement of the objects and advantages of the present invention. In this regard, it has been discovered in accordance with the present invention that the dosage of light with which the alcoholic beverage is irradiated in carrying out the accelerated aging or maturation process of the present invention must be within the range of about $1 \times 10^{-1}$ to about $1 \times 10^{-3}$ watts-sec./cm.$^3$. Such dosage or dosage factor in accordance with the present invention takes into consideration the geometry of the equipment within which the alcoholic beverage is irradiated, the total available energy from the irradiating lamps, the flow rate of the sample through the apparatus, the sample darkness and possible energy losses. In this regard, the dosage, D, is defined and derived from the following equation:

$$D = \frac{n[1-r-c(1-r)]P_i t}{x}$$

wherein $n$ is the number of lamps irradiating the beverage sample;
$P_i$ is the incident power of a single lamp;
$t$ is the exposure time;
$r$ is the fraction of energy reflected by the beverage sample;
$c$ is the fraction of light transmitted by the beverage sample; and
$x$ is the effective thickness of the beverage sample.

It is noted that from the above noted equation in defining the dosage of light takes into consideration the total available light in defining the number of lamps and the incident power of each of the irradiating lamps. The foregoing equation also takes into consideration the geometry of the equipment which is utilized as well as the flow rate and sample darkness in including the exposure time and the fraction of energy reflected and fraction of energy transmitted by the sample. The energy losses are also included within the above equation through the foregoing parameters and through the effective thickness variable within the equation. It should be readily apparent that the effective amount of light absorbed by a liquid sample (dosage) in any exposure apparatus is a function of the intensity of the light at the sample surface, the geometry of the equipment, the time of exposure, and the optical properties of the liquid, which are, of course, easily determined by routine experimentation by means of a photocell, etc. The dosage absorbed by any volume of liquid depends on the path taken by that volume. For a fixed set of operating conditions, however, the average dosage is relatively constant.

Although an exact value for absorbed light in terms of quanta or energy is difficult in any case, there are certain generalities which are true. The absorbed dosage is proportional to the product of the incident radiant energy, and the time the sample spends in the exposure chamber. The incident radiant energy is related to the number of sources, the distance between the source and the sample, and to reflection from the surrounding surfaces. The time of exposure for a continuous flow system is directly proportional to the internal volume of the apparatus and inversely proportional to the flow rate. Additionally, the dosage is higher for translucent liquids than for transparent liquids. The uniformity of exposure of a sample within the vessel, as a function of distance from the vessel walls, will be very much more uniform for transparent liquids than for the dark ones.

If an energy balance is performed on a sample, an expression for the absorbed power density, P (watt/cm.$^3$), is $$P = \frac{n(P_i - P_r - P_t)}{x}$$

where $P_i$ is the power incident on the sample per light source, $P_r$ is the power reflected by the vessel, $P_t$ is the power transmitted through the sample, $x$ is the sample thickness for rectangular geometries or one half the radius for cylindrical geometries, and $n$ is the number of light sources. The dosage, D (watt-sec./cm.$^3$) or (energy/unit volume) would then be $$D = P_t = PV/F$$

where $t$ is the residence time, V is the vessel volume and F is the flow rate (vol./time). The only two variables which may be changed arbitrarily in a given apparatus are the incident power and the residence time (or more specifically the flow rate). It is therefore more useful to express the above relations as factors of these variables alone.

The reflected energy is a function of the angle at which light strikes the vessel; the larger this angle of incidence (the angle between the light ray and the perpendicular to the surface) the greater the percentage of light reflected. The transmitted enrgy is the energy which passes into the liquid but is not absorbed, a fraction of $P_i$ minus $P_r$. The darker the liquid the less light is transmitted. This allows $P_r$ and $P_t$ to be represented as functions of $P_i$. The expression reduces to $$D = \frac{n(P_i - rP_i - c(P_i - rP_i))t}{X}$$

$$D = \frac{n(1 - r - c(1-r))P_i t}{X}$$

where $r$ and $c$ are constants between 0 and 1 which are determined by geometry of the apparatus and darkness of the sample, and $n$ is the number of operating light sources.

This equation may be used to determine dosage, or the number of lamps necessary to produce a desired dosage at a set flow rate. It may be found that the calculated number of light sources for a desired flow is fractional. The equation is then used to calculate the proper flow rate for the nearest whole number of sources.

It should again be noted that in carrying out the process of the present invention efficiently and effectively, the dosage as calculated from the foregoing equation must be within the range of from about $1 \times 10^{-1}$ to $1 \times 10^{-3}$ watts-sec./cm.$^3$.

The above dosage limitations apply to both single, double, and further multiple irradiation processes wherein the alcoholic beverage or its components are subjected to the action of actinic light on one or more occasions. Wherein more than one irradiation of the beverage or its components is carried out in accordance with the present invention, the total dosage for the multiple irradiations preferably should not exceed more than 150% of the maximum beneficial dosage for any particular beverage, although greater dosages may be utilized where desired for particular purposes.

As indicated above, it is sometimes advantageous to conduct multiple irradiations of the alcoholic beverage or its constituents. In this regard, it is sometimes advantageous to conduct more than one irradiation under the conditions described above at the same time during the production of the alcoholic beverage or at different stages in production. Since this depends somewhat on the nature of the beverage being treated, this will be described in more detail as descriptions of various embodiments of the present invention proceed.

As indicated previously, the process of the present invention is particularly applicable in the preparation of lager beers, such beers being conventionally aged for periods of time of 24 days or longer. The lagering or aging period to which the beer is subjected is generally considered as being as extremely slow and expensive part of beer production, the aging period having the advantage of providing beers with a much finer and more pleasant organoleptic taste. From a purely chemical point of view, the conception of maturity of a beer is somewhat unlike that of other alcoholic beverages since the redox-potential value of beer, a characteristic the increase of which measures the maturity of other alcoholic beverages, does not change substantially during the second stage of fermentation and subsequent storage for maturation purposes. Thus, in this regard, the volatile components present in beer are mainly responsible for the taste and flavor of the product, the volatile components being produced during the main fermentation as by-products of the physiological activity of the yeast. During the second fermentation, i.e., storage, these volatile compounds are regulated in their existence and behavior with respect to each other, partly through the yeast activity and partly through elimination of the highest volatile components with the escaping carbon dioxide. Accordingly, with respect to beer, there is a dual fermentation effect and a dual aging or maturation phenomenon.

While many attempts prior to the development of the present invention have been made in order to accelerate the process which normally takes place in the storage tanks of a brewery, all such attempts including auxiliary carbonization, second fermentation in two stages, fermentation under pressure, etc., have been unsuccessful. Accordingly, prior to the development of the process of the present invention, in order to eliminate the "young beer" taste associated with the product of fermentation, it has been necessary to store the beer over an extended and prolonged period of time. This, of course, has now been eliminated through the process of the present invention wherein the young beer can be irradiated with actinic light under the parameters as set forth above to produce a final beer product having the taste, aroma, and chemical constituency of a beer normally subjected to aging.

With respect to the accelerated aging and maturation of beer and related products, it is pointed out that irradiation in accordance with the process of the present invention can be advantageously carried out on the green beer so as to almost instantaneously mature the same and make it possible to produce a quality beer with considerable savings by almost total elimination of the heretofore necessary storage tanks. While the subjection of the green beer to the actinic radiation is advantageous in accordance with the process of the present invention, it has been discovered in accordance with a further embodiment of the present invention that substantial advantages can also be achieved by additionally or alternatively irradiating the wort. In this regard, as previously described, the wort is the extract from malt which is fermented with yeast in the production of the beer. Accordingly, by subjecting the wort to irradiation in accordance with the process of the present invention, the actinic radiation will be applied to the beer prior to the introduction of yeast and prior to fermentation.

It is pointed out with respect to the utilization of beer as the alcoholic beverage normally subjected to a prolonged aging or maturation process that while the wort and green beer can alternatively be irradiated in accordance with the process of the present invention, greater advantage is achieved by a double irradiation process by which the wort is first irradiated under the conditions as described above and after fermentation, the green beer is subsequently irradiated so as to completely eliminate the need for any storage or aging process. By employing such a double irradiation technique upon the wort and green beer, it is possible to obtain a product that is indistinguishable by taste and composition from a beer that has been obtained by the use of the more expensive technology involving prolonged aging.

In this connection, it is hypothesized that irradiation of the wort acts to advantage upon the volatile components of the wort, such action upon the volatile components of the wort influencing the volatile components produced in the beer at the time of the principal fermentation. Accordingly, by irradiating both the wort and green beer, it is possible to act upon all of the volatile constituents which may be present and accordingly provide for a product having characteristics indistinguishable from a beer produced by heretofore employed technology.

A typical schematic illustration of the process of the present invention in a beer brewery is shown in FIG. 1. In accordance with FIG. 1, the hops from which the beer is made are introduced into a hops boiler 100 containing the wort produced by the brewing of the milled and crushed malt together with water. The brewing apparatus employed in the brewing of the malt to obtain the wort and the malting apparatus utilized to produce the malt from the barley are not shown in FIG. 1. Such apparatus, however, is conventional and plays no part in the improved novel process of the present invention. In the hops boiler 100 the wort, hops, and sugar are boiled for and hour or two whereby the aroma and distinct bitterness of the hops combine with the sweetness and flavor derived from the wort and sugar. After such boiling of the hops, wort, and sugar in hops boiler 100 the product of such boiling is removed through line 102 and taken into hops vat 104. In hops vat 104 the hops are allowed to settle out from the boiled mixture of hops, wort, and sugar, that portion of the hops which is not removed in vat 104 being removed by further treating the system in centrifuge 106, it is possible to substantially remove all of the solid hops which may be present in the boiled system. Either the vat or centrifuge can be eliminated where desired or replaced with other suitable means for separating the boiled solution from the solid matter.

After the hops are removed from the boiled solution of hops, wort, and sugar, the wort leaving centrifuge 106 through line 110 is cooled in a suitable refrigeration means 112. Thus, for example, the wort produced in centrifuge 106 is brought by means of the refrigeration device 112 to a temperature slightly above 0° C., the temperature corresponding to the optimum temperature at which the yeast may be introduced in order to initiate fermentation. Rather than taking the cooled wort leaving refrigeration means 112 through line 114 directly to the fermentation vat, in accordance with this embodiment of the present invention the wort is first passed through a suitable means 116 in which the wort is subjected to the rays of actinic light within the wave-length region above ultra-violet light to 5500 A. Again, the apparatus necessary for carrying out the process of the present invention can be that which is disclosed in U.S. Pat. 3,037,116 or copending application Ser. No. 835,376. Additionally, other equivalent apparatus capable of subjecting the alcoholic beverage or its components, in this case the beer wort, to actinic rays within the region of above ultra-violet light to 5500 A. can be effectively employed in accordance with the present invention. Again, it is pointed out that it is effective in accordance with the present invention to utilize in such apparatus filters which effectively absorb substantial or all the light within the ultraviolet range. Again, as described previously in accordance with the present invention the alcoholic beverage is irradiated with light at a dosage, D, satisfying the hereinabove described equation of from $1 \times 10^{-1}$ to $1 \times 10^{-3}$ watts-sec./cm.$^3$. It should be quite obvious that if the irradiation process of the present invention is not to be applied to the wort or the wort and green beer, irradiation means 116 can be eliminated and the cooled wort leaving refrigeration means 112 through line 114 can be taken directly to fermentation vat 118. However, in the embodiment illustrated in FIG. 1, the irradiated wort leaves irradiation means 116 through line 120 and enters the fermentation vat 118 into which yeast is introduced through line 122.

In the fermentation of the wort with yeast, the yeast splits the sugars into alcohol and carbon dioxide gas, the carbon dioxide gas leaving fermentation vat 118 through line 124. Fermentation of the wort by yeast in fermentation vat 116 takes several days to about a week after which the fermented product is taken from vat 118 through line 126 and introduced into centrifuge 128. In this centrifuge the yeast is removed from the fermented wort, the wort absent yeast being taken to a second refrigeration means 130 through line 132. In this second refrigeration means, the fermented wort or green beer is again cooled to a temperature of about 0° C.

The cooled green beer leaving the refrigeration means 139 through line 134 is introduced into a column 136 into which carbon dioxide is introduced via pipe or line 138. It is within column 136 that the green beer is saturated with carbon dioxide in a manner conventional in the brewing art. The carbon dioxide introduced into column 136 through pipe or line 138 can comprise the carbon dioxide evolved as a result of the fermentation in fermentation vat 118. Preferably, however, as illustrated in FIG. 1, the carbon dioxide leaving fermentation vat 118 through line 124 is taken to a carbon dioxide cold storage from which the carbon dioxide is removed for introduction into column 136 for saturation of the green beer. At this time it is pointed out that the fermentation process illustrated including the cooling and carbonation of the green beer is only exemplary of conventional fermentation processes employed in the brewing art. In this regard, such fermentation of the wort does not play a part in the improved process of the present invention, the essence of the present invention residing in the single, double, or further multiple irradiation of the wort and/or green beer with actinic light within the wave-length region of above ultraviolet light of 5500 A. Accordingly, any conventional means and method for producing the wort and producing the beer from the wort can be suitably employed, the improvement of the present invention residing in the elimination or drastic reduction of the time necessary for aging and production of a mature, wellrounded beer.

In accordance with the embodiment shown in FIG. 1, the carbonated green beer leaves column 136 through line 140, and is introduced into an intermediate storage tank 142 in which the green beer remains for a period of 24 to about 30 hours during which time the final enzymatic treatment of the green beer takes place. After remaining in the intermediate storage tank 142 for this short period of time the green beer is removed through line 144 and filtered in a filtering medium 146 from which the green beer, free of any remaining solid matter, is removed through line 148.

If no further irradiation of the beer is to take place, the beer can be taken from line 148 directly to a tapping and bottling installation, not shown, wherein the beer can be provided in a form for commercial consumption. However, in accordance with the embodiment shown in FIG. 1, the beer leaving filter 146 through line 148 is preferably introduced into a second irradiation means 150 conducted within the same parameters as set forth above. In this second irradiation means 150 the beer is again irradiated with actinic light within the wavelength region of above ultra-violet light to 5500 A. so as to produce a final beer product having characteristics and chemical constituents substantially identical with that of the beer which has been substantially aged. Again, the irradiation means 150 can be any of those previously described which allow for the passing of the beer or similar alcoholic beverage, preferably in the form of a thin film, past a light source capable of irradiating within the wave-length set forth above.

The irradiated beer leaves irradiation means 150 through line 152 where it is taken to conventional tapping and bottling means. What is significant, however, with respect to the system illustrated in FIG. 1 is that the beer leaving irradiation means 150 need not be sent to a further storage vessel in which the beer is stored and matured for periods of time ranging up to 24 days or longer. In this regard, this entire storage facility is eliminated by the irradiation procedures in accordance with the present invention.

It should additionally be noted that while the above description has been given with respect to beer in general, and a lager beer, in particular, it should be quite obvious that the description of the single and multiple irradiation procedures in accordance with the process of the present invention is applicable to any beer type beverage including lager, beer, ale, stout, porter, bock, and similar beers, all having particular characteristics associated with the particular malting or fermentation process utilized. The production of each of these types of beer, however, can be improved in accordance with the present invention, by eliminating the heretofore necessary maturation or aging process by irradiation of the beer or wort one or more times in accordance with the improved process of the present invention. In this regard, it is again pointed out that a double irradiation of both the green beer after fermentation and the wort prior to fermentation is preferred in accordance with the process of the present invention although either irradiation can effectively improve a conventional process for beer production. In this regard, it is pointed out again that it has been discovered in accordance with the present invention that the irradiation of the wort and green beer affects chemical reactions and volatilization of the volatile components of the beer to the same effect as the prolonged conventional aging of the green beer. Substantially no effect has been found to occur with respect to the protein, tannins, and bitter substances making up the wort to the effect that the taste and chemical constituency of the beer produced in accordance with the process of the present invention is substantially identical with that produced by the conventional, more expensive, more time-consuming method.

Although the mechanism of the aging or maturation of distilled spirits is slightly different than that which has been described above with respect to beer porduction, it is pointed out that the distilled spirits can be produced in a more expeditious manner in accordance with the process of the present invention again through a single or multiple irradiation procedure. In this regard, it is again pointed out that the distilled spirits to which the process of the present invention is applicable are those which are normally subjected to a prolonged aging and storage or maturation processes for a period of time ranging from about 2 years to 12 years or longer. Thus, it is such aging generally carried out in wooden barrels which can be eliminated or drastically reduced in accordance with the present invention by irradiation of the distilled spirits one or more times with actinic light within the wave-length region of above ultra-violet light to 5500 A. Thus, it has been discovered in accordance with the present invention that through the process of the present invention, it is possible to provide a distilled spirit which has a chemical constituency and characteristics of taste and aroma which are substantially the same as the distilled spirit subjected to the conventional technology of aging.

As indicated above, the alcoholic beverages falling into this second category of those which can be advantageously processed in accordance with the present invention are those beverages which are subjected to a distillation or distillation and rectification by which a grain spirit is increased in alcohol content, the distillation being conducted until a certain proof product results. Thus, for example, whiskey being a typical distilled spirit is produced from grain which is diluted with water and cooked and subsequently left to ferment. The product of the fermentation of the grain, i.e., corn, rye, barley, etc., is then pumped into huge patent stills for distillation and rectification, the whiskey being distilled to less than 190° proof U.S. (by law in the United States). Above such a figure, the spirit loses all of its characteristics or congeners of the grain used and becomes merely neutral or silent spirits. After such distillation and rectification, flavorings may be added, the spirit being subsequently diluted with water and aged for a period of time ranging from about 2 years to 12 years or longer. It can be seen from the above that the irradiation of the distilled spirit in accordance with the process of the present invention can be carried out in a number of different places during the distilled spirit production.

First of all, the product of grain fermentation can be irradiated prior to any distillation and rectification, the irradiation at this point in the process having the effect of altering the chemical constituency of the spirit to the effect that upon subsequent distillation and rectification the distilled alcoholic beverage will have a chemical constituency similar and substantially equivalent to that of a distilled spirit produced by a conventional process involving prolonged aging and maturation. Thus, by irradiation of the fermentation product prior to distillation and rectification, the alcohol content of the fermentation product can be chemically altered through subjection to the actinic radiation such that upon subsequent distillation and rectification a proper balance of volatile components will exist within the distilled spirit. This application would be carried out in an apparatus in which there were means within the apparatus to place the semi-solid liquid mass defined as the fermentated product in a direct position to receive the actinic light. Subsequent dilution of the distilled spirit to produce a consumable product of salable proof will therefore provide an end product requiring little, if any, aging.

Secondly, it should be clear from the general description set forth above, that the irradiation procedure in accordance with the process of the present invention can be applied to the product of the distillation and rectification of the grain fermentation product. By irradiating at this point in the distilled spirit production the product of distillation and re-rectification predominating in ethyl alcohol can have its chemical constituency altered such that the final product after dilution is substantially equivalent to a similar distilled spirit produced in accordance with current conventional technology.

Thirdly, it should be clear that in addition to irradiation to irradiation with actinic light immediately after distillation and rectification in the production of the distilled spirit, the distilled spirit can be irradiated after dilution with water and production of a consumable and salable proof. Here again, such irradiation is conducted prior to and in lieu of conventional aging and maturation conducted subsequent to the dilution of the distilled and rectified spirits. Thus, whether concerned with whiskies, i.e., bourbon whiskey, corn whiskey, rye whiskey, straight whiskey, blended whiskey, scotch whiskey, vodka, gin, rum, or similar distilled spirits including brandies, and similar liqueurs, etc., the process of the present invention is applicable in that it pertains to irradiation either before or after the distillation and rectification procedure, such that the product of distillation and rectification, upon subsequent dilution, substantially approximates a similar product subsequently subjected to a prolonged aging and maturation process. Thus, in accordance with the process of the present invention, the aging of the distilled spirit in wooden barrels is eliminated or substantially reduced through the irradiation of the spirit with actinic light within the wave-length region of the above ultra-violet light-5500 A.

As was the case with respect to beer production, in addition to a single irradiation of the distilled spirit at any one of the three places in the production process as described above, the distilled spirit can be subjected to two or more irradiation procedures during the separate stages of the spirit production or successively during one particular stage. In this regard, however, it has been discovered in accordance with the present invention that where multiple irradiations of the distilled spirit are involved, it is preferred to allow the irradiated product to sit for a period of time of approximately 24 hours or longer prior to a second or subsequent irradiation procedure. This allows for the most effective utilization of the process of the present invention.

When multiple irradiations take place either at the same or at different stages in the production of the distilled spirit it is preferred that the total dosage not exceed 150% of the maximum dosage for that particular beverage. Here again, when conducting such multiple irradiations in the production of distilled spirits, the dosage of irradiation must be within the limits earlier described.

The same considerations set forth above with respect to beer and distilled spirits, whether they be brandies, whiskies, vokda, gin, rum, etc., can be said again with respect to the production of wine in accordance with the process of the present invention. With respect to wines, there are so many different varieties with different aging characteristics that it is difficult to make very general statements concerning the nature of the aging and maturation process to which wines are normally subjected. However, a few general statements can be made. First of all, it is again pointed out that the basic ingredient of wine is the grape, although materials now called wines are produced from other fruit varieties. In preparing the wine, the skin, pulp, and seeds of the grape or similar fruits, each donate certain qualities to the alcoholic beverage. Grape skins give mainly tannins and coloring matter, the color and tannin being generally conceded to be bound in the internal portions of the skin cells. In this regard, until these cells are killed, it is very difficult to remove the pigments and several methods have been developed to cause cell death and cell wall collapse. These methods include, for example, the application of heat, alcohol, or physical disintegration. The application of alcohol is usually utilized and this is accomplished by allowing the juice and skins of the grape to ferment together until sufficient alcohol is produced to cause the cell walls to become permeable and the color to be released. The extraction of color rises to its peak after a few days then diminishes. Thus, for example, rosés are separated quickly from the skins and are vatted for a shorter time than red wines, while white wines are made from grapes that have been separated from the skins at the outset. Accordingly, it is seen that regulation of the vatting time can regulate the color of the desired wine. The tannins also pass from the skin and pulp to juice during vatting and the essential difference between red and white wines lies more in the tannin content than in the color.

The skin and pulp of the grape are the important elements for the wine maker. In this connection, the seeds contain tannin and an oily resinous material that would render the wine unpalatable if released; accordingly, care must be taken not to break the seeds during the pressing operation utilized in wine production. Another element that may figure in the constitution of wine is the stalk or stem of the grape bunches, since this element is also rich in tannin. Because it is rich in tannin, it will be included in the materials vatted in areas yielding soft wines. In most cases, however, the stems are taken out before the grapes and juice go into the fermenting vats.

In wine production, after vatting, the extracted juices, etc., are subjected to a fermentation process with yeast. In this regard, it has been found that most of the constituents found in the must, i.e., the product of vatting, remain to some degree in the fermented wine. Generally speaking, the fermentation of the must is a process which is one which essentially changes the hexose sugars, i.e., dextrose and levulose, into alcohol and carbon dioxide through the action of yeast. Additionally, about 10% of the sugar is fermented into by-products such as glycerine, butylene glycol, aldehydes, etc., such that a statement regarding the conversion of sugars into ethyl alcohol and carbon dioxide is an over-simplification of a complicated series of chemical reactions which actually occur during fermentation. In this regard, the dextrose molecule alone passes through 12 stable intermediary stages before forming the alcohol and dicarboxylation takes place along the way, carbon dioxide gas being given off at several places. In addition, there are some 30-odd organic and inorganic substances which must be present in the system if the fermentation of the must to the wine is to be accomplished.

There are a wide variety of yeasts which can be employed to ferment the must to the desired wine, the strain of yeast somewhat depending on the nature of the product desired. Wine yeasts ferment effectively over a wide temperature range of 50° to 90° F., white wines being generally fermented at lower temperatures and red wines at slightly warmer temperatures. After fermentation of the must with yeast, the wine, be it red wine, white wine, etc., is generally subjected to an initial aging and racking procedure. This initial aging and racking of the wine is generally accomplished in barrels for a period of about one year, quality wines being further barrel-aged for a further one-year period, rarely shorter. During these periods of aging, the barrel is first lightly bunged and later more tightly bunged so as to initially allow and subsequently prevent evaporation and oxidation of the aged and racked wine. During the first year of aging, considerable changes in color and taste occur, while such changes are not so noticeable during the second year. However, the wine continues to deepen in color and flavor, deriving character and mellowness from contact with the wooden barrel during the racking and aging process.

In most cases, the wines are kept racked for a further year, longer in some cases, and just before bottling or shipping the wine undergoes a fining operation to keep the wine perfectly clear and free from any suspended particles. In addition to the initial aging that occurs for 1, 2, or more years, most wines continue to age and mature after bottling. Thus, both in barrel and in bottle the aging of wines shows a decrease in acidity and a transformation in the alcohol, acids, and other components to form enumerable complex compounds such as esters, aldehydes, acetals, and the like. Additionally, bouquet is an important product of aging, particularly with respect to those wines which are capable of developing their best characteristics in the absence of air. Accordingly, the aging and maturation of wine occurring both in barrel and in bottle has heretofore been considered a necessary, prolonged, and drawn out procedure allowing for the production of the best quality wines.

It can be seen from the above, that the process of the present invention can be applied at various stages in the production of wine so as to produce a product in which the aging and maturation has been accelerated. Thus, for example, as was the case with respect to the application of the process of the present invention to beer production, the irradiation can be accomplished on the must prior to fermentation or can be applied to the fermented wine prior to or subsequent to the initial aging and racking operation. Thus, if the irradiation conducted within the parameters set forth above were conducted prior to the fermentation process, such irradiation of the must would provide for a fermented product having a chemical constituency and characteristics substantially the same as those obtained with respect to a fully aged and mature wine. In this regard, the effect of irradiation prior to fermentation has the effect of altering the chemical constituency of the must such that upon subsequent fermentation, a composition is produced having qualities not substantially like the qualities of the fermentation of a non-irradiated must but substantially similar to the qualities of the fermentation product subsequently aged and matured over an extended and prolonged period of time.

Irradiating the wine after fermentation of the must, of course, has the advantages of acting upon the same material as does the prolonged and extended aging and maturation process to which the wines are now conventionally subjected. In this way, it is possible, through irradiation, to provide the product of fermentation with the same chemical constituency and other characteristics as a fully aged and mature wine produced by the heretofore conventional technology. Additionally, it is noted that the irradiation can take place after the initial short period of aging and racking generally employed on conjunction with the preparation of wines. While such a procedure would involve a short aging and maturing period, it is pointed out that the irradiation subsequently applied to the preliminarily aged wine would effectively eliminate the secondary aging and maturing process both in barrel and in bottle to which the wine is normally subjected. As was the case with respect to beers and distilled spirits, the process of the present invention when applied to wines can involve both a single irradiation at any one of the places above defined or two or more irradiations at the same or different locations during the processing of the alcoholic beverage.

With respect to wines, it is preferred that the irradiation in accordance with the present invention be conducted subsequent to the fermentation of the must although a combined process involving irradiation of the must and the fermentation product can be advantageously employed to produce a product which even more closely approximates and is substantially identical to a wine produced in accordance with conventionally employed current technology. As was the case with respect to beers and alcoholic beverages, it is necessary in accordance with the present invention that the alcoholic beverage, i.e., wine or its constituents, i.e., must, be irradiated with actinic light within the wave-length region of above ultraviolet light to 5500 A., at a dosage of about $1 \times 10^{-1}$ to about $1 \times 10^{-3}$ watts-sec./cm.$^3$.

As was the case with respect to the irradiation of beer and distilled spirits in accordance with the process of the present invention wherein multiple irradiations are involved, it is preferred from a standpoint of economy, etc., that the total dosage for the multiple irradiations not exceed 150% of the maximum efficient irradiation for that particular beverage.

With respect to the general considerations concerning the process of the present invention, it is pointed out that there are certain distinct advantages associated with the process of the present invention when compared, for example, with the conventional methods of producing and aging beer, distilled spirits, wines. Thus, for example, the process of the present invention eliminates the storage and aging time but still effects the necessary mechanical and chemical maturation, thereby rapidly producing high quality alcoholic beverages. In this regard, the process of the present invention eliminates the necessary tie-up of capital over prolonged periods of time such as involved with the aging of beer, distilled spirits, wines, and similar alcoholic beverages. Moreover, the utilization of the process of the present invention permits quick adjustment of production to the volume of sales, permits economy in construction and expansion of facilities, permits economy in personnel necessary to maintain the storage facilities and maintains a regular quality of the alcoholic beverage throughout the year. These and other advantages of the process of the present invention can certainly not be minimized.

It is known that the foregoing description of the present invention has included a dosage parameter which equates the total available energy, flow rate, sample darkness, energy losses as well as the geometry of the apparatus in which the irradiation takes place. In this regard, as indicated previously, the object of the advantages of the present invention can be achieved when the alcoholic beverage, i.e., beer, distilled spirits, or wine is irradiated one or more times with actinic radiation within the wave-length region of from above ultraviolet light, i.e., above about 4000 A. to 5500 A. at a dosage of from $1 \times 10^{-1}$ to $1 \times 10^{-3}$ watt-sec./cm.$^3$. While such relationship holds true for the irradiation of any and all alcoholic beverages in accordance with the present invention, it is preferred in accordance with the present invention to irradiate the alcoholic beverage sample as a thin flowing film, preferably a film of no more than 50 cm. in thickness. Moreover, it is preferred in accordance with the present invention to irradiate such thin flowing film for only a short period of time, preferably from about 2 seconds to about 10 minutes, more preferably from about 2 seconds to about 30 seconds. In this regard, it has been discovered in accordance with the present invention that the most beneficial effects in the accelerated or maturation of the alcoholic beverage, i.e., beer, distilled spirits, or wine are achieved when the alcoholic beverage is irradiated in the form of a thin flowing film for a short period of time. It should still be recognized, however, that in order to achieve the objects and advantages of the present invention the foregoing equation with regard to the necessary dosage must be satisfied.

In connection with the above, it should be recognized that the optimum time of irradiation for any particular system can be easily calculated from the optimum dosage as previously set forth by determining the fraction of energy which is reflected and fraction of light transmitted, assuming that the parameters of total energy and thickness are set. Similarly, by setting the time for exposure, the precise number of lamps and energy which must be utilized in effectively carrying out the process of the present invention can be easily determined from the foregoing equation, as can be applicable, thickness of the irradiated sample by again determining the fraction of energy absorbed and the fraction of light transmitted, noting again that the dosage of light which must be incident upon the beverage to carry out the object and advantages of the present invention must be within the range of from about $1\times10^{-1}$ to about $1\times10^{-3}$ watt-sec./cm.$^3$.

The process of the present invention and a product produced thereby will now be illustrated by the following specific examples.

EXAMPLE 1

Employing a brewery system such as illustrated in FIG. 1, various test samples of beer were produced through irradiation so as to compare the organoleptic character of the beer with one produced in a conventional process involving aging for a period of 24 days. The experimental runs were carried out in an installation for fermenting and lagering with storage vessels of 100 liters capacity per vessel, each vessel having its own "spund" for carbonization pressure and its own system for cooling. The wort which served for the production of the beer in a conventional aging process and for the experimental run conducted through irradiation of the wort and fermentation product with actinic light came directly from the brewery's brewhouse, such as brewed for sale. In all of the experimental runs conducted and reported herein, the wort was strictly controlled to comprise the same composition and each experimental run was conducted in a comparative manner with a comparative fermentation procedure conducted at low temperature.

The technology of fermentation for all of the experimental runs was slightly modified in that after the main fermentation the beer was kept for 3 to 4 days at a higher temperature in the storage vessel in order to rapidly produce the necessary carbon dioxide and pressure on the "spund." As soon as the pressure on the "spund" was reached, the temperature was dropped to 0° C., the product being subsequently thereafter bottled.

During the main fermentation, once the maximum temperature of 8° C. was reached the fermentation was then conducted isothermally to its end and the young beer, as mentioned above, was put at the same temperature into the storage vessel. The irradiation apparatus employed in conducting the various irradiation treatments involved was operated with a capacity of 120 liters per hours.

In determining the effectiveness of the irradiation of the young beer and wort under the conditions of the present invention, comparative tests were conducted with the organoleptic examination of the following beers:

(A) Beer produced by classical lager technology with 24 days storage.

(B) Beer produced with 7 days storage, only young beer irradiated.

(C) Beer produced with 7 days storage, wort and young beer irradiated.

(D) Beer produced with 7 days storage, not at all irradiated.

In conducting the comparative tests, main concern involved a determination of the volatile components present in the beer both produced by the conventional lager technology and in accordance with the irradiation procedure of the present invention. The definition of the volatile components was made since the presence of the volatile components and the quantity thereof determines the maturity and characteristics of the final beer product. In this regard, little attention was paid to the proteins, tannins, and bitter substances present in the beer since the irradiation has little effect upon their presence or amounts.

For purposes of determining the nature and amount of the volatile components present in the beer both produced by the process of the present invention and the conventional lager method, a standard beer was produced and subjected to gas chromatography, the results being shown in the following table. With respect to this table, the spectrum numbers which appear opposite the chemical designations refer to the gas chromatography spectrums to be hereinafter described with reference to the test procedure:

TABLE 1

| Name | | Number spectrum |
|---|---|---|
| Acetic acid-methyl ester | $CH_3COOCH_3$ | 1 |
| Ethanol | $C_2H_5OH$ | 2 |
| Acetic acid-ethyl ester | $CH_3COOC_2H_5$ | 3 |
| Propionic acid-ethyl ester | $CH_3CH_2COOC_2H_5$ | 4 |
| Diacetyl | $CH_3COCOCH_3$ | 5 |
| Propanol | $CH_3CH_2CH_2OH$ | 6 |
| Acetic acid-isobutyl ester | $CH_3COOCH_2CH(CH_3)_2$ | 7 |
| Butyric acid-ethyl ester | $CH_3(CH_2)_2COOC_2H_5$ | 8 |
| 2-methylpropanol-1 | $(CH_3)_2CHCH_2OH$ | 9 |
| n-Butanol | $CH_3(CH_2)_2CH_2OH$ | 10 |
| Acetic acid-amyl ester | $CH_3COO(CH_2)_4-CH_3$ | 11 |
| 3-methylbutanol-1 | $(CH_3)_2CHCH_2-CH_2OH$ | 12 |
| Caproic acid-ethyl ester | $(CH_3CH_2)_4COOC_2H_5$ | 13 |
| Acetic acid-hexyl ester | $CH_3COO(CH_2)_5CH_3$ | 14 |
| n-Hexanol | $CH_3(CH_2)_4CH_2OH$ | 15 |
| Acetic acid | $CH_3COOH$ | 16 |
| Caprylic acid-ethyl ester | $CH_3(CH_2)_6COOC_2H_5$ | 17 |
| Propionic acid | $CH_3CH_2COOH$ | 18 |
| Isobutyric acid | $(CH_3)_2CHCOOH$ | 19 |
| Butyric acid | $CH_3(CH_2)_2COOH$ | 20 |
| Isovaleric acid | $(CH_3)_2CHCH_2COOH$ | 21 |
| Furfuryl alcohol | $C_4H_3OCH_2OH$ | 22 |
| Capric acid-ethyl ester | $CH_3(CH_2)_8COOC_2H_5$ | 23 |
| Caproic acid | $CH_3(CH_2)_4COOH$ | 24 |
| Acetic acid-β-phenylethyl ester | $CH_3COOCH_2CH_2C_6H_5$ | 25 |
| β-Phenyl ethanol | $C_6H_5CH_2CH_2OH$ | 26 |
| Caprylic acid | $CH_3(CH_2)_6COOH$ | 27 |

In making the above standard gas chromatography analysis as well as the gas chromatographic analyses of the various test samples produced, the same conditions were utilized. These can be summarized as follows:

| | |
|---|---|
| Throughflow of carrier-gas | $N_2$ 44 ml./min. |
| Program | 6° C./min. |
| Injection | 200° C. |
| Detector (F/D) | 220° C. |
| Column | Glass, 2 m./$\phi$ 4 mm. |
| Filling | Reoplex 400. |
| Paper shift | 0.88 cm./min. |
| Spray | 8 $\mu$l. (microliters). |
| Equipment | Fa. Carlo ERBA (Italy). |

In accordance with the test procedure, a portion of the wort was irradiated and pitched, while a further portion of the wort was pitched without irradiation. The irradiation was carried out by passing the wort through an apparatus such as illustrated in U.S. Pat. 3,037,116. The apparatus was equipped with plexiglass plates filtering out substantially all of the ultra-violet light emitted by the light sources so that the wave-length of light incident upon the beer was concentrated within the wave-length region of 4100 to 5500 A. Taking into consideration the number of bulbs, incident power of each bulb, exposure time, etc., the irradiation dosage employed was from about 40 to $120 \times 10^{-4}$ watt-sec./cm.$^3$.

The quantity of the wort which was pitched without irradiation was fermented and separated into two batches. One of these batches was finished in a storage tank in the classical 24-day method, this beer serving as a reference beer representing the classical lager technology. The other remaining portion of the batch of non-irradiated wort was kept after fermentation only 7 days in storage. This batch was again divided into two separate batches one of which was filtered and bottled after the 7-day storage period, the other of which was filtered, irradiated, and bottled. The 7-day storage period was employed for $CO_2$ production only which storage could be eliminated if $CO_2$ recuperation system was available while fermenting. Accordingly, in such a manner the experimental samples A, B, C, and D described above were prepared.

As a general observation of the gas chromatographic spectrum of the volatile compounds present in the various samples, it was noted that irradiation in accordance with the process of the present invention in general leads to a reduction of the chromatographic waves of all of the components with the exception of 3-methylbutanol-1 and $\beta$-phenyl acetate, chromatographic Nos. 12 and 25. Accordingly, it is concluded from such an analysis that irradiation does have an effect upon the volatile components present in the beer. The specific effect upon the volatile components can be observed from the chromatographic analyses of the various samples A through D.

Figure 2:
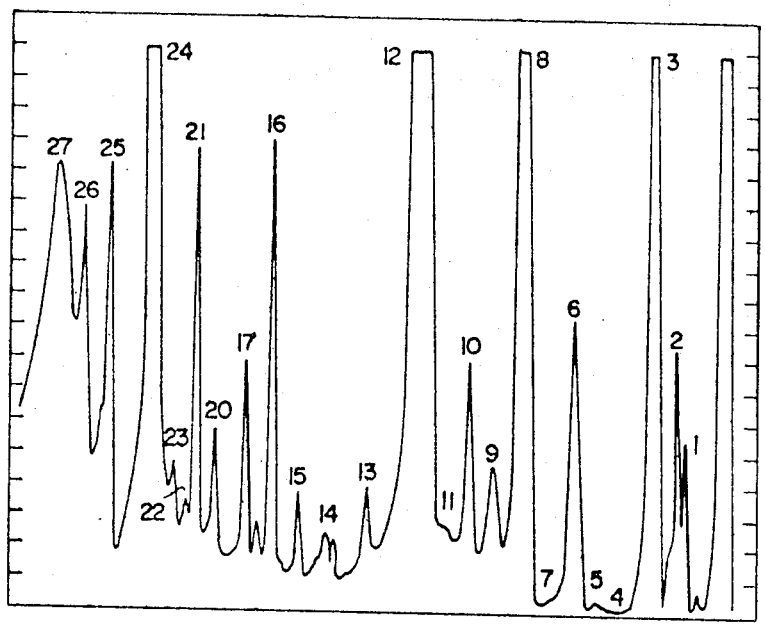
Figure 3:
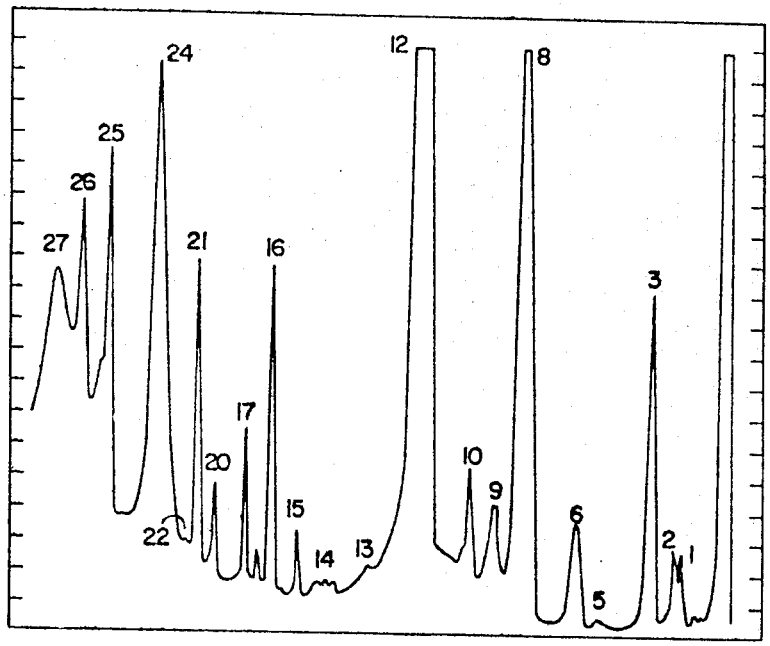
Figure 4:
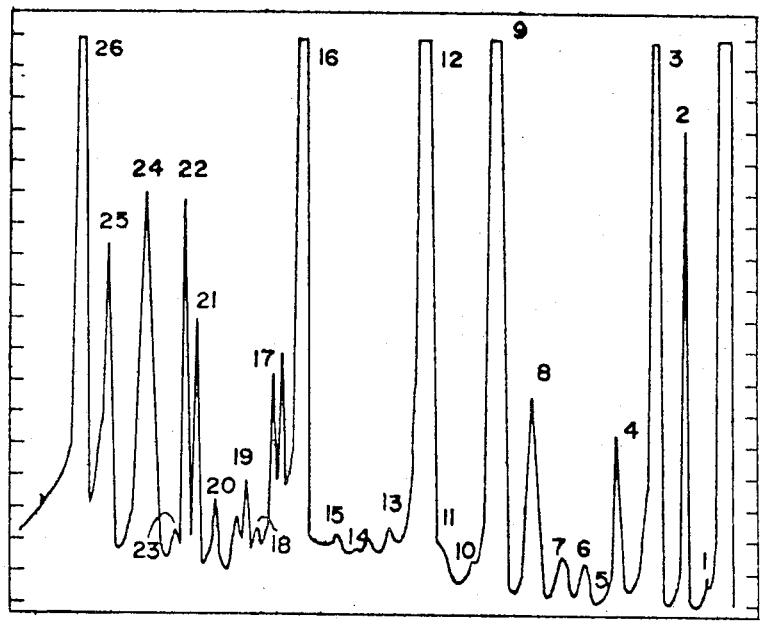
Figure 5:
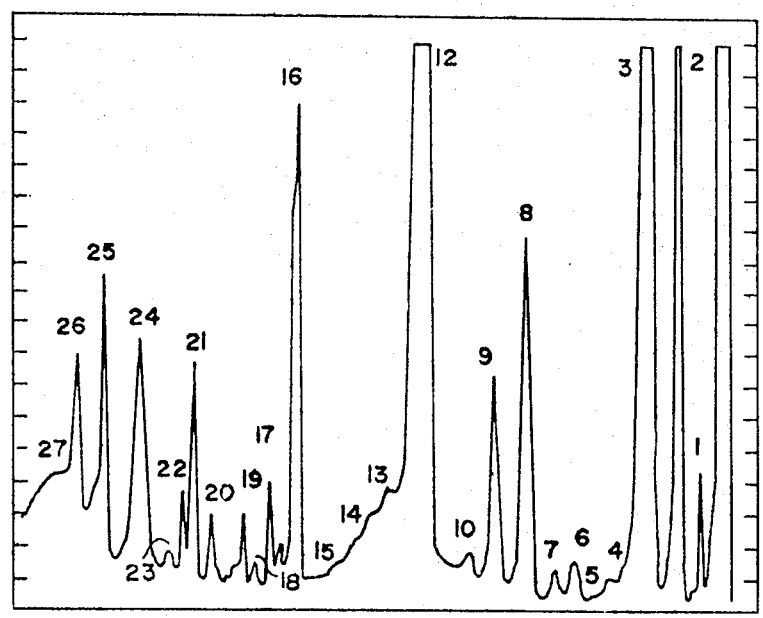
Figure 6:
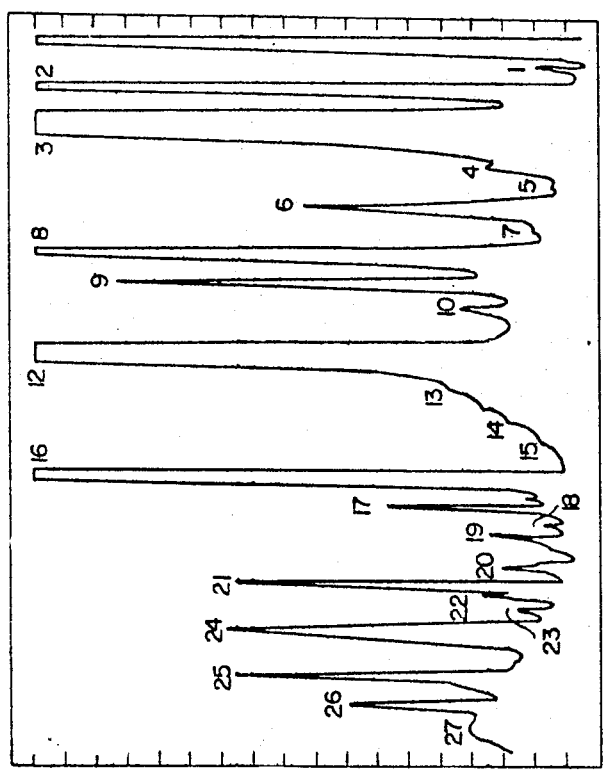

The gas chromatographic analysis of the young beer wherein the wort was not subjected to irradiation in accordance with the process of the present invention is shown in FIG. 2. An examination of the gas chromatograph indicates the inferior quality of the young beer due to an inferior content of aromatics and higher alcohols. In comparison, an analysis of the gas chromatograph for the young beer in which the wort is irradiated (FIG. 3), the finished beer wherein only the filtered beer has been irradiated (FIG. 4), and the finished beer in which both the wort and filtered beer have been irradiated (FIG. 5) with the beer produced by the classical lager method (FIG. 6) illustrates that the irradiation process of the present invention allows for the production of a beer which closely resembles the conventional lager beer in chemical constituents.

In this connection, it will be observed from FIGS. 3 through 6 that the beer which has been double irradiated, i.e., has been irradiated both with respect to the wort and with respect to the filtered beer, closely approximates the chemical constituency of the lager beer subjected to conventional aging over a period of 24 days. Accordingly, it is seen that the double irradiation provides for a beer with the optimum composition of volatile substances which are indeed comparable to a beer made by a classical lager technique.

Organoleptic examination of the 4 sample beers was also made by a test panel. As a result of the organoleptic examination, sample A, the reference beer made by the conventional lager technique and sample C, the beer produced by irradiation of the wort before pitching and irradiation of the beer before bottling were given the same number of points indicating comparable taste and other characteristics. Sample D, the non-irradiated beer with only 7 days storage was judged by all members of the test panel to be inferior thereby giving this beer the lowest rating.

EXAMPLE 2

The applicability of the process of the present invention in the production of a distilled spirit was demonstrated as follows. Utilizing apparatus similar to that used in Example 1, a mixture of molasses and ethyl alcohol was irradiated by passing the mixture through the apparatus at a flow rate of 2 to 2.5 minutes of irradiation per liter of flowing liquid. The initial material which was irradiated in such a manner was the product of distillaton of molasses and ethyl alcohol, an initial material utilized in the production of rum.

In order to demonstrate the effectiveness of the irradiation treatment in accordance with the process of the present invention, a gas chromatogram was run on the original sample of distillation not subjected to irradiation, the irradiated sample after 14 days storage to stabilize the spirit and a further sample of distillation which has been conventionally aged after 9 months storage in an oak barrel. The original product of distillation is shown in the gas chromatogram appearing as FIG. 7; the product of the irradiation procedure of the present invention appears as the gas chromatogram of FIG. 8; and the conventional product of 9 months storage in an oak barrel appears as the gas chromatogram of FIG. 9.

Figure 7:
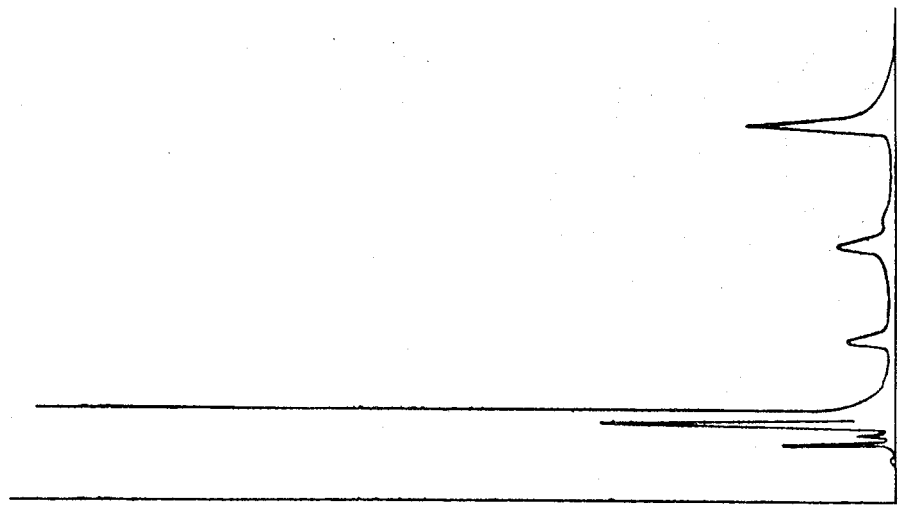
Figure 9:
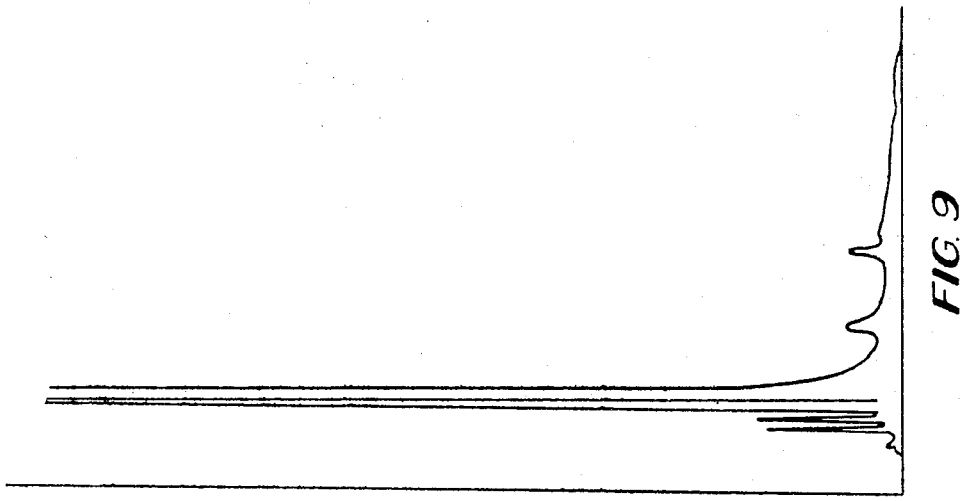
Figure 8:
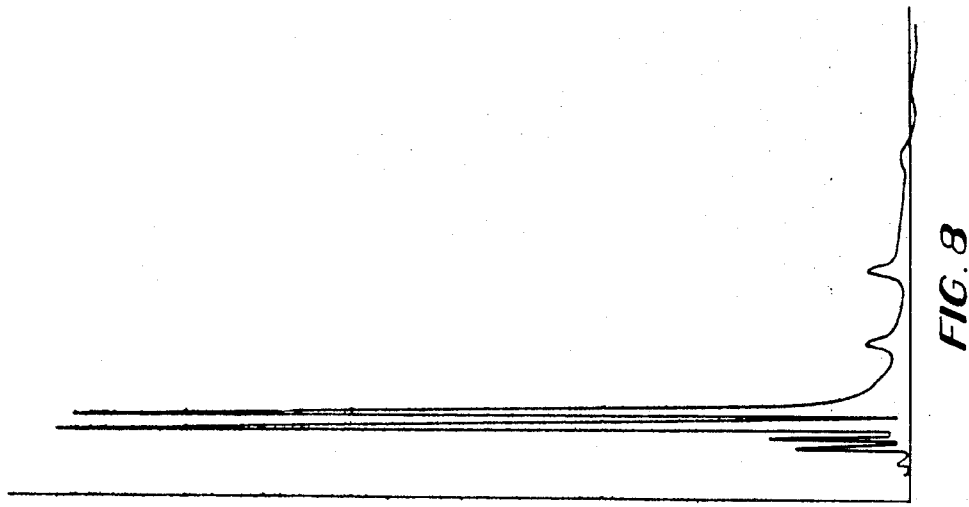

Reference to FIGS. 7 to 9 indicates that FIG. 8, illustrating the gas chromatogram of the distillate subjected to irradiation in accordance with the process of the present invention, shows an increased aldehyde content for the irradiated spirit. This indicates that the irradiation conducted in accordance with the process of the present invention provides for an oxidation process which is substantially identical with that of the distilled spirit which has been subjected to an aging for a period of 9 months in an oak vessel. This therefore indicates that the irradiation in accordance with the present invention produces a chemical oxidation effect somewhat akin to the conventional prolonged aging of the spirit.

In addition, FIG. 8 illustrates a reduction in the content of the material having a high boiling point in the same manner as does FIG. 9 when compared for example with the young alcohol or distillate product not subjected to irradiation or an aging or maturation process. This is explained by the fact that the irradiation in accordance with the present invention provides for an increased esterification effect which again is almost identical with the sample illustrated in FIG. 9 which has been subjected to an aging and maturation process for 9 months in an oak vessel.

Furthermore, a visual examination of FIGS. 8 and 9, i.e., the gas chromatograms of the irradiated spirits and the aged spirit by conventional techniques indicates that chemically the same are practically identical. This, therefore, establishes the ability of the irradiation process of the present invention to substantially eliminate the need for aging and maturation of the distilled spirit by providing a product having substantially identical chemical constituency and characteristics.

EXAMPLE 3

The process of Example 2 is repeated except that the irradiation is not conducted with respect to the product of distillation but is conducted with respect to such product diluted with pure water in one case, and with water and carbonic acid in a second case in a ratio of 1 part spirit to 3 parts of water or water and carbonic acid. Here again, when the irradiation is conducted with respect to the salable distilled spirit, i.e., rum, the chemical constituency of the irradiated product is substantially identical with the product subjected to a normal period of aging. In addition, the harmony of taste between the irradiated distilled spirit and that subjected to a conventional aging procedure is such that the products are practically indistinguishable.

EXAMPLE 4

The process of the present invention was applied to a 4-year-old blended Canadian whiskey. Such whiskey was passed through an apparatus similar to that used in Example 1 and exposed to 20-watt lights emitting actinic radiation for a period of 30 seconds. The dosage as calculated from the formula given hereinafter was $90 \times 10^{-4}$ watt-sec./cm.$^3$. After exposure of the 4-year-old whiskey to actinic radiation in accordance with the process of the present invention, a marked improvement in both taste and bouquet was observed.

This, therefore, illustrates that the process of the present invention is applicable to an improvement in the taste and bouquet of distilled spirits and other alcoholic beverages which have already been subjected to an aging or maturation process. The employment of the process of the present invention with such products, however, will provide for an improved product having a taste and bouquet substantially the same as a product which was aged for a considerably longer period of time than the initial product irradiated.

EXAMPLE 5

Example 4 is repeated except that the blended Canadian whiskey was replaced with a 5-year-old scotch and a 6-year-old bourbon. The scotch was irradiated at a dosage of $135 \times 10^{-4}$ watt-sec./cm.$^3$ while the bourbon was irradiated at a dosage of $170 \times 10^{-4}$ watt-sec./cm.$^3$. Both products showed a marked improvement in both taste and bouquet.

EXAMPLE 6

A further test of the irradiation process of the present invention was conducted on a rum from Ingenio El Potrero, Cordova, Mexico. The rums tested were first (a) green or new rum, (b) rum that has been aged for 6 months, (c) rum that has been aged for 1 year, (d) rum that has been aged for 2 years, and (e) rum that has been aged for 3 years. The various products were irradiated in an apparatus similar to that used in Example 1 under similar conditions.

In all instances, however, it was discovered that a marked and substantial improvement of the potrero rum as far as taste and bouquet are concerned occurred. The results indicated that even the new or green rum that was subjected to irradiation in accordance with the process of the present invention was of such a quality that the same could be commercially bottled and marketed immediately. This accordingly eliminates the generally required aging and maturation process to which this distilled spirit is normally subjected.

With the rums that have been previously subjected to a 1, 2 or 3 year aging process, it was discovered that the taste and boquet was improved to the point where the rum could not be distinguished from one which had been aged for a considerably longer period of time.

EXAMPLE 7

The process of the present invention was also applied to a conventional Hyac whiskey base in the production of artificial whiskey utilizing the following Hyak brands:

(1) Whiskey, 10 to 100 ratio, 45% alcohol
(2) Whiskey, 5 to 100 ratio, 46% alcohol
(3) Whiskey, 1 to 100 ratio, 60% alcohol All of the above whiskies artificially produced are passable though hardly the equivalent of commercially distilled products. However, when such whiskies are passed through an apparatus such as illustrated in U.S. Pat. 3,037,116 under conditions similar to Example 1, the bouquet, taste, and odor of the whiskey is completely altered and a completely commercially acceptable product is obtained. Such a product which was previously barely passable prior to irradiation is now of such a quality that the same can be commercially bottled and sold.

EXAMPLE 8

The applicability of the process of the present invention to the accelerated aging and maturation of wines was demonstrated as follows: Bordeaux wines, both red and white produced by the yeast fermentation of grapes of the Cabernet vine, Semillon, and Muscadelle were subjected to a preliminary aging and racking in barrels for 1 year after which the wines were irradiated in accordance with the process of the present invention. Thus, the wines are passed through an apparatus similar to that of Example 1 and irradiated with actinic light within the wave-length region of about 4100 to 5500 A. at a dosage of about $95 \times 10^{-4}$ watt-sec./cm.$^3$. As a result of such irradiation of both the red and white wines, it is found that the bouquet and taste of the wine closely approximates that of a similar wine further subjected to a prolonged aging and maturation process. Accordingly, such aging and maturation can be eliminated when the wine is irradiated as in accordance with the present invention. After irradiation, the wine was fined and bottled and in a condition for immediate consumption. Here again, this illustrates the effectiveness of the process of the present invention through the irradiation and accelerated aging of alcoholic beverages and wines, in particular.

EXAMPLE 9

The process of Example 1 was repeated to age Tequila. The Tequila was irradiated with actinic light within the wavelength region of from about 4100 to 5500 A. at a dosage of $90 \times 10^{-4}$ watt-sec./cm.$^3$. An evaluation of the product indicated an improvement in flavor.

As indicated previously, the improved process of the present invention while described as an accelerated aging and maturation process for alcoholic beverages in general, does not truly age the beverage, since no elapse of time is involved. However, the aging or maturation normally taking place with respect to the storage of beers, distilled spirits, wines, etc. is certainly accelerated in that the products irradiated in accordance with the present invention have a chemical constituency and other characteristics of bouquet, taste, etc., which substantially reproduce these same characteristics of the alcoholic beverage which has been subjected to the conventional aging procedure. While in some cases it is possible through the process of the present invention to completely eliminate the entire need for aging or maturation of the alcoholic beverage, it is sometimes necessary to age or mature the beverage even after irradiation since the irradiation has the effect of reducing or substantially reducing the aging time. Thus, for example, in the case of scotchs, bourbons, and other whiskies, etc. which are aged for periods of time of 8, 10, 12 or more years, it is sometimes necessary to age for a substantially shortened period after irradiation, since the irradiation process of the present invention has the effect of materially reducing the necessary aging requirements. With respect to other alcoholic beverages, however, the aging can be completely eliminated through the process of the present invention whereby the irradiation of the alcoholic beverage or its constituents effects the production of a product of the same chemical constituency and other characteristics of aroma, taste, bouquet, etc., substantially identical with that of the conventionally aged product.

It is also again pointed out with respect to the process of the present invention that while a single irradiation of the alcoholic beverage at the time when aging would occur is effective to substantially reduce the necessary aging and maturing time usually involved, it is sometimes preferred to employ two or more irradiation procedures at the same point in the production process or at different stages of production. In this regard, for example, it is sometimes preferred, as in the case of beer production, to age the alcoholic beverage both immediately prior to bottling and before fermentation while in a condition called a wort. This, therefore, allows for the best possible route to substantially reproducing the qualities of a high quality beer normally subjected to a conventional long-term lagering process.

All of the above advantages and objects of the novel process of the present invention are achieved through one or more irradiations of the alcoholic beverage normally subjected to a prolonged aging or maturation process or the constituents of such alcoholic beverage with actinic light within the wavelength region of above ultra-violet to 5500 A. As pointed out above, such irradiation is conducted at a dosage of $1 \times 10^{-1}$ to $1 \times 10^{-3}$ watt-sec./cm.$^2$. Within this region it has been found that a substantially improved process and product can be developed.

What is claimed is:

1. In a process for the accelerated aging and maturing of alcoholic beverages normally subjected to an extended storage for aging and maturation purposes selected from the group consisting of wines and distilled spirits, the improvement which comprises affecting an acceleration of the effects of normal aging and maturing by irradiating said alcoholic beverages by continuously passing actinic light from an artificial lamp source thereinto in substantially the wavelength range of from 4000 A. to about 5500 A. at a dosage (D) satisfying the equation $$D = \frac{n[1-r-c(1-r)]P_i t}{x}$$

wherein $n$ is the number of lamps irradiating the beverage sample;
$P_i$ is the incident power of a single lamp;
$t$ is the exposure time;
$r$ is the fraction of energy reflected by the beverage sample;
$c$ is the fraction of light transmitted by the beverage sample; and
$x$ is the effective thickness of the beverage sample of from about $1 \times 10^{-1}$ to about $1 \times 10^{-3}$ watt-sec./cm.$^3$.

2. The process of claim 1 wherein said irradiation is conducted at that time in the production of said alcoholic beverages when normal storage for purposes of aging and maturation would occur.

3. The process of claim 1 wherein said irradiation is conducted at that time in the production of said alcoholic beverages prior to when normal storage for purposes of aging and maturation would occur.

4. The process of claim 1 wherein said irradiation is conducted two or more times during the production of said alcoholic beverages.

5. The process of claim 4 wherein at least one of said two or more irradiations is conducted at that time in the production of said alcoholic beverages when normal storage for purposes of aging and maturation would occur.

6. In a process for the accelerated aging and maturing of beer, the improvement which comprises affecting an acceleration of the effects of normal aging and maturing by irradiating both the wort prior to fermentation and the fermented beer by continuously passing actinic light from an artificial lamp source thereinto in substantially the wavelength range of from 4000 A. to about 5500 A. at a dosage (D) satisfying the equation $$D = \frac{n[1-r-c(1-r)]P_i t}{x}$$

wherein $n$ is the number of lamps irradiating the beverage sample;
$P_i$ is the incident power of a single lamp;
$t$ is the exposure time;
$r$ is the fraction of energy reflected by the beverage sample;
$c$ is the fraction of light transmitted by the beverage sample; and
$x$ is the effective thickness of the beverage sample of from about $1 \times 10^{-1}$ to about $1 \times 10^{-3}$ watt-sec./cm.$^3$.

References Cited

UNITED STATES PATENTS

| 1,140,882 | 5/1915 | Fazi | 99—29 X |

FOREIGN PATENTS

| 850,635 | 10/1960 | Great Britain. |
| 468,990 | 7/1937 | Great Britain. |

OTHER REFERENCES

Hetstein et al., Chemistry and Technology of Wines and Liquors, D. Van Nostrand Co., Inc., New York, 1948 (pp. 144–147).

Amerine et al., The Technology of Wine Making, 2d, The Avi Publ. Co., Inc., Westport, Conn., 1967 (pp. 288–289).

DAVID M. NAFF, Primary Examiner